Sept. 1, 1959   R. WILKES   2,902,152
DRILL CALIBRATOR AND SORTER
Filed July 15, 1957   5 Sheets-Sheet 1

INVENTOR.
REUBEN WILKES
BY
Cook & Robinson
ATTORNEYS

Sept. 1, 1959 R. WILKES 2,902,152
DRILL CALIBRATOR AND SORTER
Filed July 15, 1957 5 Sheets-Sheet 2
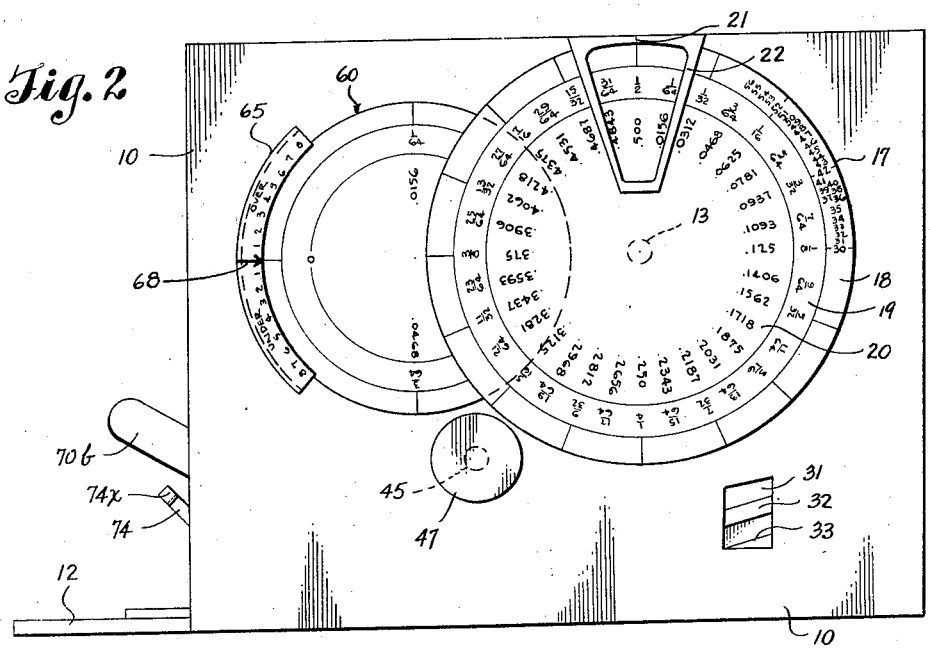
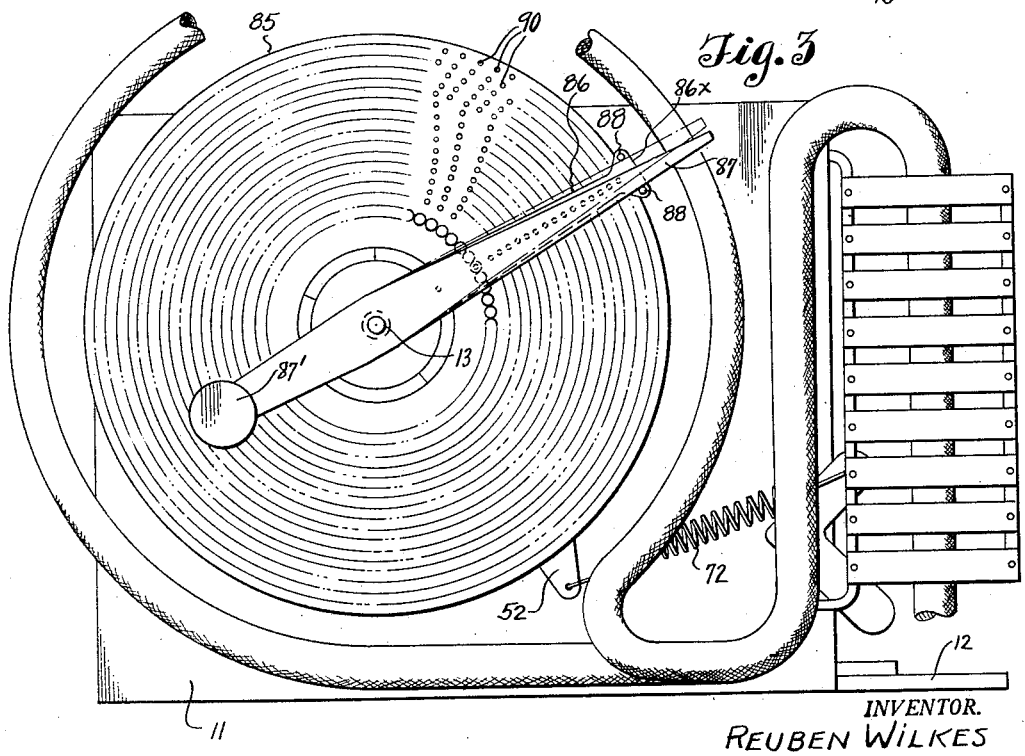
INVENTOR.
REUBEN WILKES
BY
Cook & Robinson
ATTORNEYS Sept. 1, 1959   R. WILKES   2,902,152
DRILL CALIBRATOR AND SORTER
Filed July 15, 1957   5 Sheets-Sheet 3
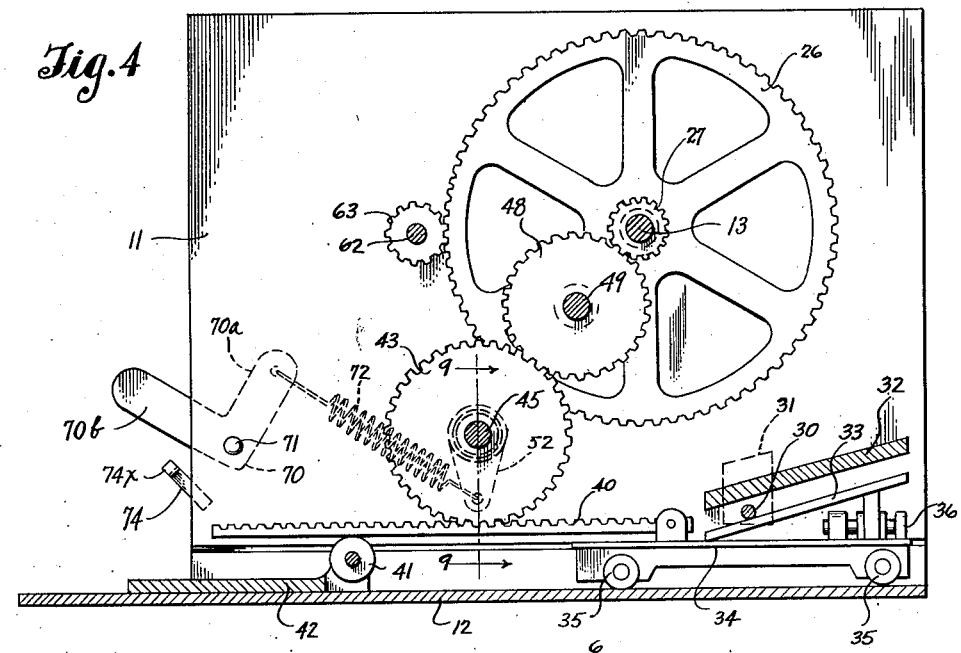
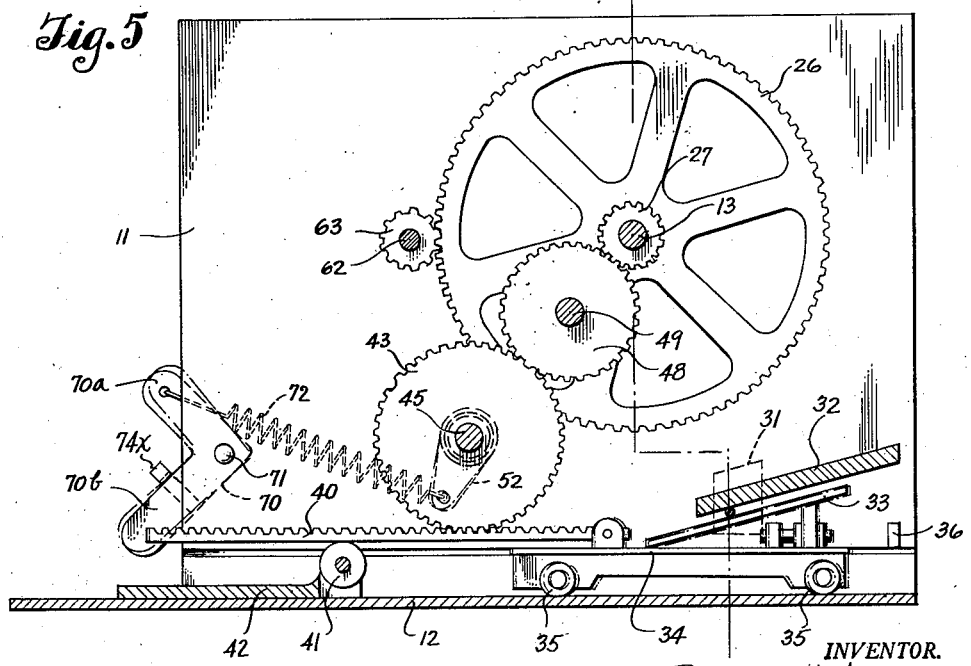
INVENTOR.
REUBEN WILKES
BY
Cook & Robinson
ATTORNEYS

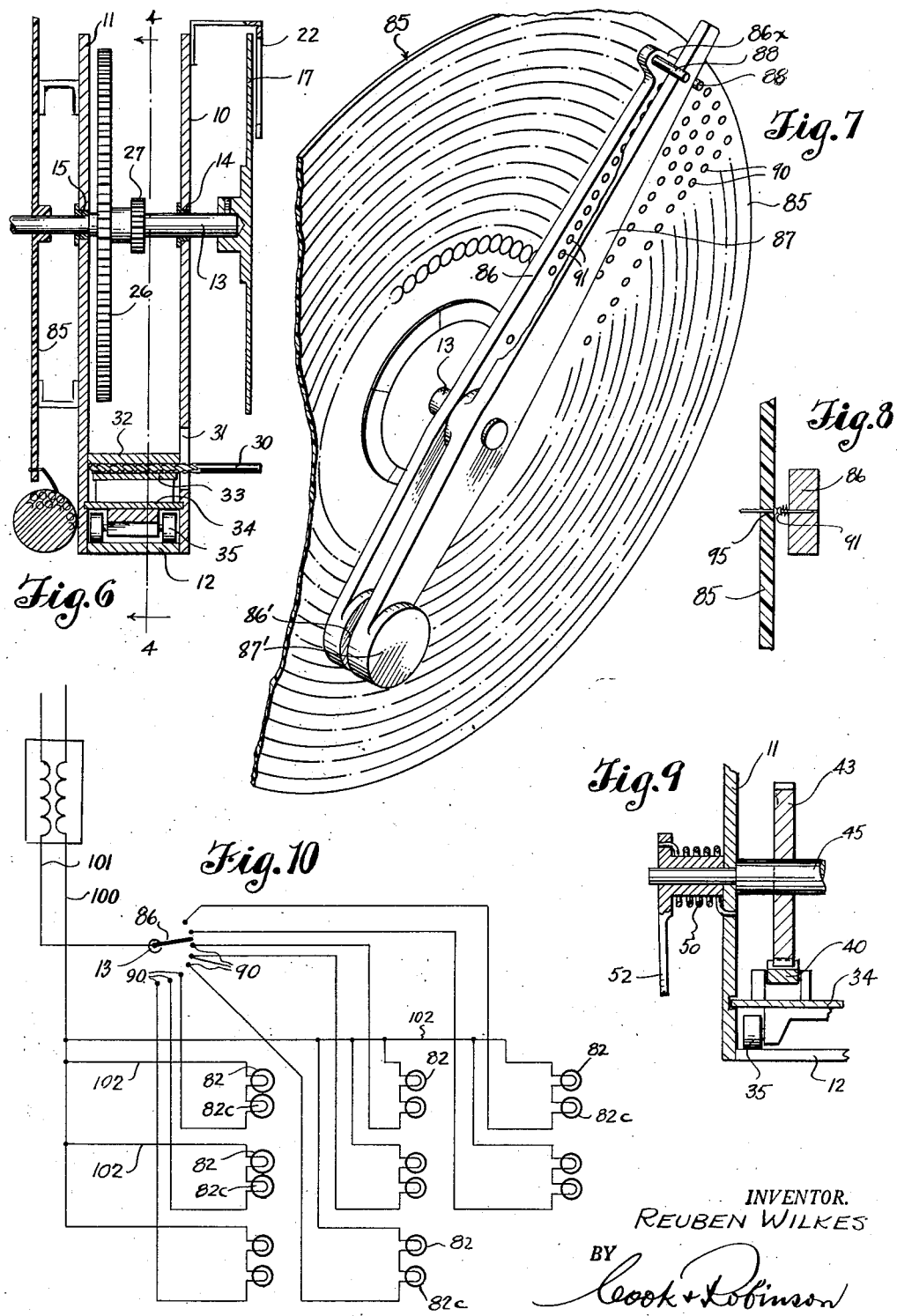

Sept. 1, 1959
R. WILKES
2,902,152
DRILL CALIBRATOR AND SORTER
Filed July 15, 1957
5 Sheets-Sheet 5
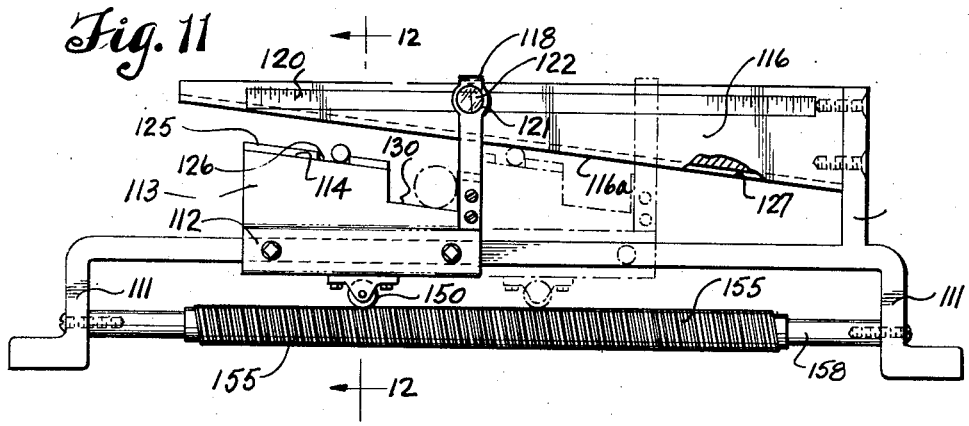
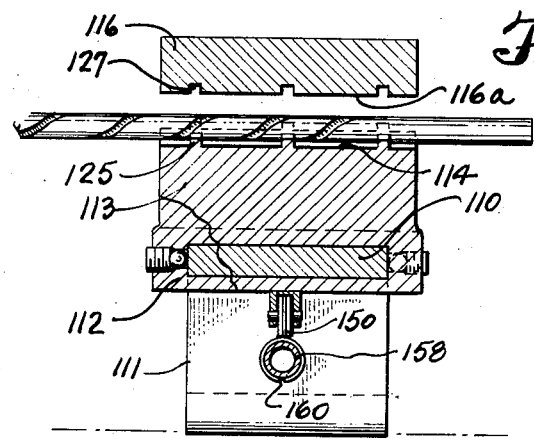
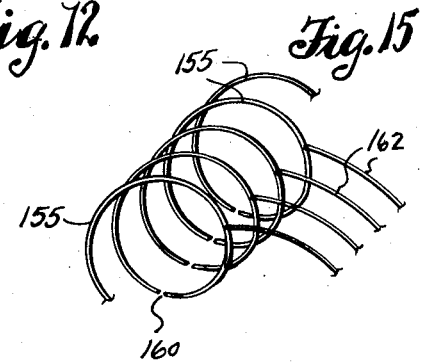
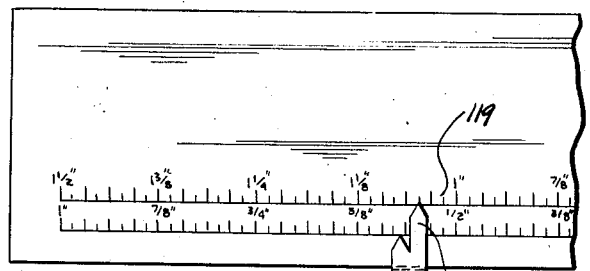
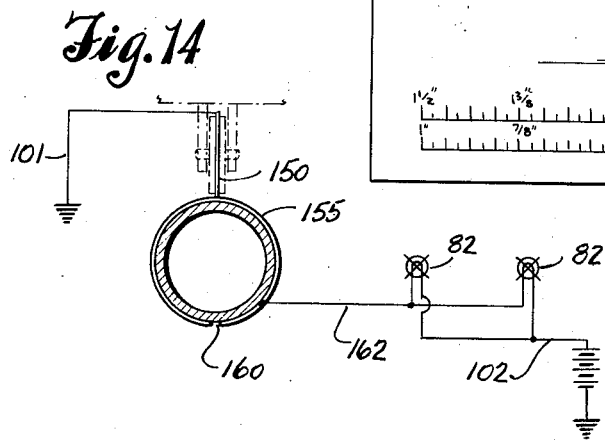
INVENTOR.
REUBEN WILKES
BY
Robinson & Berry
ATTORNEYS

United States Patent Office 2,902,152
Patented Sept. 1, 1959

2,902,152

DRILL CALIBRATOR AND SORTER

Reuben Wilkes, Seattle, Wash.

Application July 15, 1957, Serial No. 671,987

11 Claims. (Cl. 209—122)

This invention relates to a means for measuring and indicating the diameters or sizes of drill rods and other round objects of similar form, and it has for its principal object to provide a device for that particular purpose that is easy to use; accurate in its readings and especially useful for the quick measuring of drill rods especially of the smaller sizes as used by machinists in industrial plants but which may range from 1/16 inch up to 1/2 or even to one inch in diameter.

More specially stated, the principal object of the present invention is to provide a mechanism or apparatus for the above stated purpose that is equipped with a fixed or stationary plate with a flat, inclined surface and a coacting, or companion plate with a flat surface that is always parallel to that of the fixed plate, and which companion plate is adapted to be moved along a fixed plane toward and from the fixed plate, and against any object that may be placed between said flat surfaces for taking its diametric measurement, and with which coacting plates means is provided to indicate to an exact measurement, the spacing of the plates as established by any object that is placed between them for measurement; this measurement representing the size or diameter of the object.

It is a further object of the present invention to provide a measuring device of the above stated kind, in conjunction with a cabinet or container that is provided with individual compartments for drills of different sizes or diameters, and wherein each compartment is equipped with an electrically energized means such as, for example, an incandescent lamp, which will be illuminated to designate the individual compartment of the container into which the object being measured is to be placed for storage.

It is a further object of the present invention to provide a means that is operable in connection with the size indicating dial, to show to what extent, if any, a drill or other measured object may be oversize or undersize.

Still further objects of the invention reside in the details of construction of the various parts embodied in the mechanism, in their combination and in the mode of use of the apparatus, as will hereinafter be fully described.

In accomplishing the above mentioned and other objects of the invention, I have provided the improved details of construction, the preferred forms of which are illustrated in the accompanying drawings, wherein:

Fig. 2 is a front elevation of the present measuring mechanism.

Fig. 3 is a back view of the same.

Fig. 4 is a vertical section, taken in a plane that is parallel to and just within the face plate of the device, substantially on line 4—4 in Fig. 6, showing the parts ready to receive a drill rod for measurement.

Fig. 5 is a similar view showing a drill rod being measured.

Fig. 6 is a section through the device, taken substantially on the line 6—6 in Fig. 5.

Fig. 7 is a fragmental perspective of the contact carrying arm and disk associated with the measuring mechanism.

Fig. 8 is a sectional detail showing the character and arrangement of the circuit establishing contacts on the contact disk and revoluble arm.

Fig. 9 is a sectional detail taken on line 9—9 in Fig. 4.

Fig. 10 is a partial wiring diagram of the electrical system.

Fig. 11 is a side view of a drill measuring device of an alternative form, embodied by the present invention.

Fig. 12 is a cross-sectional view of the same, taken on line 12—12 in Fig. 11.

Fig. 13 is a top or plan view of a part of the device of Fig. 11, showing the direct reading indicator as applied thereto.

Fig. 14 is a detail of the circuit contact device of the electrical indicator. Fig. 15 is a detail in perspective.

Figure 1:
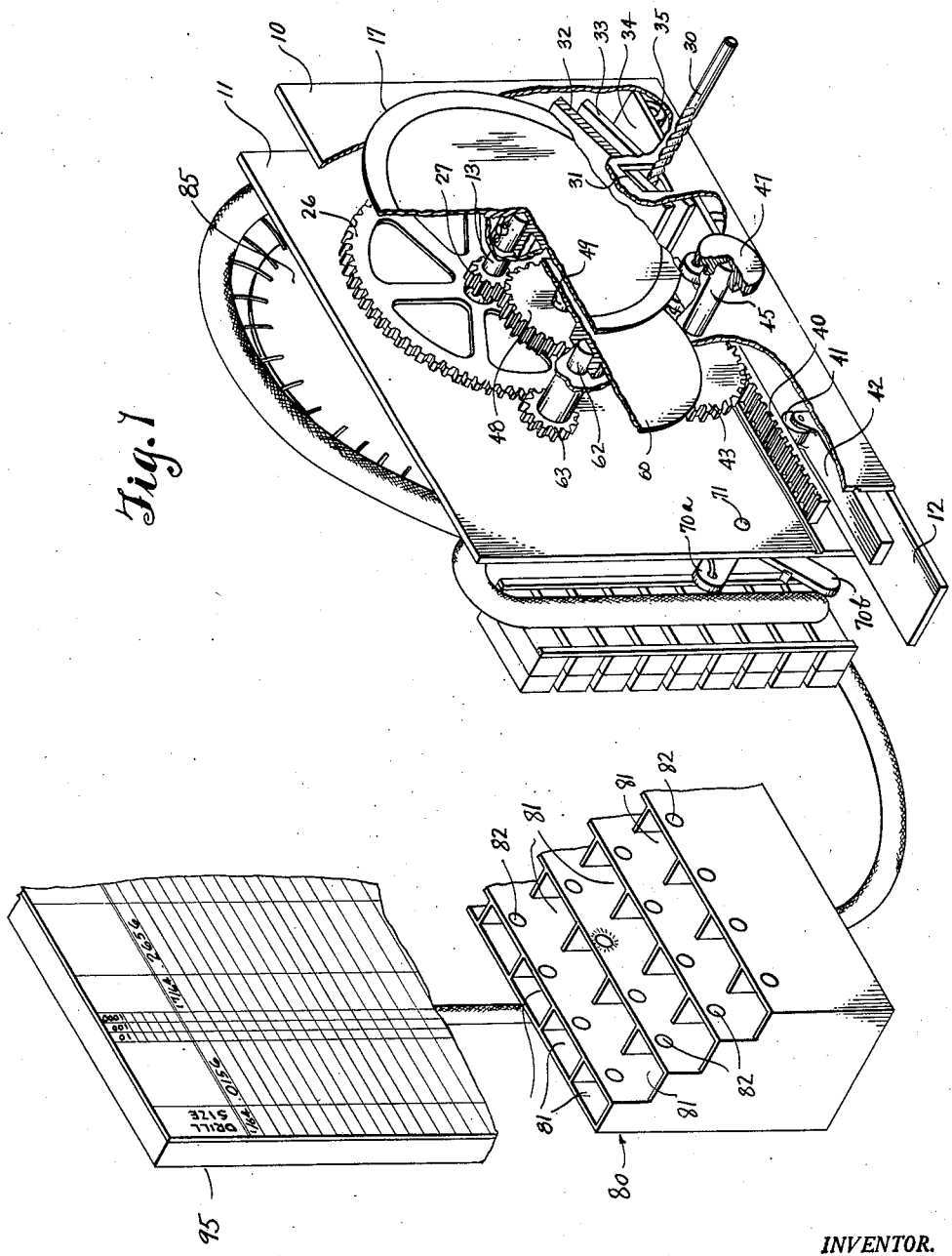
Fig. 1 is a perspective view of a drill rod measuring device embodied by the present invention, showing it as used in conjunction with a pocketed or compartmented cabinet, or rack, and a size indicating chart.

The present application is a continuation-in-part of my pending application filed under Serial No. 515,125 on June 13, 1955, and allowed on Jan. 17, 1957, and now abandoned.

In the following specification, the term "drill rod" is used to designate any round rod or object, whether drill rod, wire, or other similar object, that is of suitable kind to be measured by use of the present mechanism.

Referring more in detail to the drawings and first to the disclosures of Figs. 1 to 10:

In this form, the device comprises a rigid frame structure formed by two flat, rectangular plates 10 and 11, designated respectively, as the "front plate" and "back plate"; these plates being vertically disposed and jointed in spaced, parallel planes by a horizontal base bar 12 to which the plates are fixed.

Extended horizontally between and through the plates 10 and 11, approximately at their centers, is a shaft 13; this being the main dial supporting and rotating shaft and it is revolubly mounted in bearings 14 and 15, set in the plates 10 and 11 as has been shown in Fig. 6. Fixed on the forward end of the shaft 13 is the size indicating dial, or disk 17; this being formed with three peripheral, concentric bands or columns 18, 19 and 20, as seen in Fig. 2, which are graduated or marked to designate diameters or sizes of objects that may be measured by the apparatus, as will later be described in detail.

In taking a measurement of an object, the reading or indication on dial 17 is taken in reference to a mark or line 21 formed on a triangular pointer plate 22 that is fixed to the plate 10 in position to overlie a top portion of the face of the dial, shown in Figs. 2 and 6.

Fixed on the shaft 13, between the plates 10 and 11, is a relatively large gear wheel 26. This has a hub portion on which a gear wheel 27, of relatively small diameter, is fixed, and it is through this latter gear that the shaft 13 and the graduated dial 17 fixed thereon is rotated to give the readings which designate size or diameter of the measured objects.

For the measuring and indicating of the diameter of a drill rod, such as that shown at 30 in Fig. 1, the rod is held by one end portion and its other end portion is passed through an opening 31 formed in the front plate 10, and is disposed between two spaced, parallel plates 32 and 33 designated as the measuring plates. Plate 32 is rigidly fixed in the frame structure between and perpendicular to the plates 10—11, and in a position inclined downwardly and to the left hand side in respect to its showing in Figs. 1, 2 and 3. The plate 33 is disposed below and with its top surface parallel to plate 33. It is mounted on a supporting carriage 34, equipped at its opposite ends with paired supporting wheels 35—35 designed for rolling travel between the plates on the horizontal base plate 12. The carriage is adapted to be limited in its travel toward the right, in reference to its showing in Fig. 4, by a stop block 36 fixed to the frame plate 11, and is movable in the opposite direction until the flat top surface of plate 33 flatly engages with the flat bottom surface of the fixed plate except when an object is disposed between these surfaces for measurement. When the plates are flatly together, the dial reading will be zero.

The carriage 34 is adapted to be moved endwise by a rack bar 40, fixed thereto at one end, and supported at its other end on a roller 41 carried on a bearing plate 42 that is fixed to base bar 12 as well shown in Figs. 4 and 5. Disposed between the plates 10 and 11, and in mesh with the rack bar 40, is a gear wheel 43 that is fixed on a supporting cross shaft 45 that extends revolubly through the plates 10 and 11. One end of shaft 45 extends forwardly from the plate 10 and has a knurled knob 47 fixed thereon whereby the shaft and gear 43 can be manually rotated. Disposed between and operatively meshing with the gear wheels 43 and 27 is an idler gear 48; this being fixed on and revolubly supported by a cross shaft 49 that is extended between and through the plates 10—11 of the frame structure for rotation.

Back and forth travel of the carriage is effected by turning the knob 47, and it will be understood that when the carriage 34 has been moved to its limit of travel to the right, in reference to its showing in Fig. 4, the plates 32, 33 will be in maximum spacing; in the present instance this is one-half inch. Assuming, however, that with the plates 32 and 33 spaced apart as in Fig. 4, and that a drill rod 30 has been passed through the hole 31 in plate 10 and placed between them for measurement, the knob 47 may be grasped by the operator and rotated in a clockwise direction to cause gear 43, through rack bar 40, to move the carriage 34 to the left, and thereby cause the drill rod to be clamped between the flat, parallel surfaces of plates 32—33. In thus rotating the gear 43, the gear 26 and shaft 13 are caused to be rotated accordingly through the mediacy of gears 48 and 27, thus to rotate the graduated dial 17 to indicate, by reference to the line 21 on marker 22, the size or diameter of the measured drill.

As soon as the drill size has been noted by the reading, the knob may be released, and the carriage and dial will then be returned to the initial or starting position; this return being accomplished automatically by the force of a coiled spring 50 that is applied under tension about the rear end portion of shaft 45, as seen in Fig. 9; the opposite ends of the spring being attached, respectively, to the back plate 11 of the frame structure and to a lever arm 52 that is fixed on the shaft end. Fig. 9 shows the lever arm to be formed with a hub portion 52x about which the spring is coiled, and the arm normally extends in a downwardly directed position for a purpose presently explained.

Referring now to the graduating of the columns 18, 19 and 20 of dial 17, each of which extends through the full circle or 360°. The outer column 17 is divided by lines that are radial of the dial, into sixteen equal divisions; the division lines being successively marked in thirty-seconds of an inch, thus providing for the measurement of objects up to one-half inch in diameter. The central column 19 is similarly graduated, but also shows sixty-fourths of an inch. The inside column 20 is graduated to show the measurements in decimals instead of fractions.

Associated with the dial 17, is a second and smaller dial 60, the purpose of which is to indicate, if a drill is not of an exact size, the extent of its oversize or undersize. This dial is fixedly mounted on the forward end of a shaft 62 that extends horizontally through the plates 10 and 11 and is equipped with a small driving gear wheel 63 in operative mesh with gear 26, as shown in Figs. 4 and 5; this gear being one-eighth the size of gear 26. Fixed to plate 10 and extending along a peripheral part of the dial 60, is an arcuate scale 65, that extends through an arc of 90° along the edge of dial 60. The dial 60 has an encircling peripheral graduated scale divided into four equal parts. The scale 65 which extends through 90° is graduated in eight equal parts in each direction from a center point designated by the arrow at 68. By reason of the geared connections of dials 17 and 60, it is provided that when the zero point of dial 17 is set in coincidence with line 21, the zero point of dial 60 will coincide with the arrow 68. Therefore, in the measuring of any drill, the size reading will be taken on dial 17 in reference to the line 21 on marker 22, and the reading as taken on the scale 65 will indicate the extent of undersize or oversize if there be any.

Instead of turning the shaft 45 by grasping the knob 47 to take a size reading of a drill, I have provided the lever 70 of bell crank form well shown in Figs. 4 and 5. This lever is mounted on the back side of plate 11, at the left hand side, by means of a pivot bolt 71. This lever has an arm 70a extended upwardly from the pivot, this being connected through the mediacy of a coiled spring 72 with the end of the lever 52 which is fixed to the inner end of shaft 45. The lever 70 also has an arm 70b that extends laterally beyond the edge of plate 11 so that the user of the machine can easily manipulate it with his left hand while holding the measured object in his right hand.

Assuming that a drill rod has been placed in position to be measured between plates 32 and 33 as shown in Fig. 4, the operator then depresses the arm 70b of lever 70 downwardly, as from its position of Fig. 4 to position of Fig. 5, and cause it to be engaged beneath a catch portion 74x of a yieldable latch plate 74 fixed on plate 11. With the swinging action of the bell crank lever, the spring 72 is placed under tension and through its pull on lever 52 it rotates shaft 45 to shift the carriage 34 to the left to clamp the drill rod between plates 32 and 34 and establish a reading of the drill size as shown by the scale of dial 17 in reference to line 21. After a reading has been taken, the latch head 74x is disengaged from arm 70b and the coiled spring 50, as applied about the hub portion of lever 52, operates to rotate the shaft 45 to return the parts to starting position.

It is customary where a large number of drill rods are to be measured, that rods of different sizes be kept in separate compartments of a container or cabinet, such, for example, a cabinet which might be like or similar to that shown in Fig. 1 and designated by numeral 80. This cabinet shown to be formed with separate compartments 81, each to receive and hold drills of one specific size.

In the present instance each compartment is equipped with a small incandescent lamp 82, and provision has been made, through means operable by the turning of shaft 13 in taking a reading to designate the compartment in which the measured drill is to be stored by causing the light of the proper compartment to be illuminated.

For this above purpose, I have fixed a disk 85 to the back side of plate 11; this plate being non-rotatable, and concentric of the shaft 13, with the rear end of the shaft extending through and beyond it. Mounted on the rear end of shaft 13, as best shown in Fig. 7, are two radially extending lever arms, 86 and 87, each being properly counterbalanced by weighted ends 86′ and 87′. The lever 87 is fixed to the shaft 13 and extends radially slightly beyond the periphery of the disk 85. The lever arm 86 is at the inside of lever 87 and is free on the shaft for relative rotative movement. It extends to the periphery of the disk and there is formed with a cross arm 86x in which two pins 88—88 are fixed in spaced relationship, and which extend outwardly. The outer end portion of lever 87 extends between these pins with substantial clearance that permits the relative rotative movement of the two levers indicated by the full line and dotted line position of lever 87 in Fig. 3.

The disk 85 is of an electrically non-conductive material as indicated in Fig. 8, and mounted therein in a series of concentric rows, are electrical contacts 90. Likewise, mounted in the lever arm 86 is a succession of contacts 91 corresponding to the circular rows of contacts on the disk. As the lever arm 86 is rotated by the shaft 13, its contacts are caused to engage with contacts on the disk, and through the connections thus made, circuits are closed with the various lamps. In taking a rod measurement, the lamp 82 that is illuminated when the lever 86 stops moving will designate the compartment in which the measured rod is to be placed.

In conjunction with the compartmented cabinet, I also employ a size indicating chart 95 on which drill sizes are shown in fractions and their decimal equivalents. It is seen in Fig. 1 that the chart is lined vertically to set off columns for fractional parts of an inch, and adjacent thereto are columns for the decimal equivalents of the fractions. Corresponding fractions and equivalents are set off by the horizontal lines. The chart is of a translucent material, and back of each notation thereon is a small incandescent lamp 82c; these lamps having circuit connections with the contacts of the disk 85 and arm 86, providing that when a certain compartment lamp is illuminated, the drill size for that compartment will be indicated both by the fractional indication and its decimal equivalent.

The electrical wiring for the contacts and lamps has been diagrammatically shown in part in Fig. 10 wherein 100 and 101 designate wires from a source of supply of current. Wire 101 leads to arm 86 and there has connections with each of the contacts thereon. Wire 101 has circuit connections, as at 102 with each of the disk contacts, these connections in each instance leading through the lamps 82 and 82c as used in the cabinet and in chart 95 that correspond to the different disk contacts. Lamps as used in cabinet and chart are shown to be in series connections.

Fig. 10 indicates in a diagrammatic way, the arm 86 as arranged for rotative movement by and about shaft 13, and as adapted to engage with contacts 90 formed in an arcuate row; it being understood that this represents only a few of the contacts of one of the several circular rows as applied to the back of the fixed disk 85. Each of these contacts has one of the circuit wires 102 leading thereto. The other circuit wire leads to arm 86. The arrangement provides that when a contact 91 on the arm engages a contact on the disk, an electric circuit is closed through the lamps 82 and 82c of that particular circuit to designate respectively, the compartment 81 that is to receive the measured drill, and on the chart, to designate the size of the drill.

It is possible then after a measurement has thus been taken, for the tight holding of the drill between the measuring plates 32 and 33 to be released to permit disposal of the measured drill, but without cutting off current to the lamps which have been illuminated. This is by reason of the provision of the lost motion connection between the outer end portions of the levers 86 and 87. When the operator presses the bell crank arm 74b downwardly to its full distance to take a reading, as from position of Fig. 4, to that of Fig. 5, the tension of spring 72 overcomes spring 50 and the shaft 45 is rotated to actuate the rack bar 40, and move the carriage 34 to take the measurement of the object as previously placed between the plates 32 and 33. As the shaft 13 is rotated through its geared connection with the shaft 45, it swings the lever 87, which moves the lever 86, through contact with a pin 88. After the reading has been taken, the operator then merely eases off on the lever 70b permitting it to move back slightly, as for example to the dotted line position of Fig. 5. This eases off the tension of spring 72 sufficiently to allow spring 50 to slightly rotate shaft 45. This shifts the carriage sufficiently to release the drill from between the measuring plates but does not move the arm 86 to break the lamp circuit. Therefore, the circuit being closed, the lamps will remain illuminated. When the drill has been disposed of in the proper compartment, the operator can then release the lever 70 and the mechanism will be returned by the springs to starting position.

As an alternative mode of operation, the operator after placing a drill in a measuring position between the plates 32 and 33, presses the lever arm 74b down to a latched position as in Fig. 5. He then, after observing that a lamp has been illuminated, grasps the knob 47 at the front of the machine and slightly rotates shaft 47 to shift the carriage for release of the measured drill from between the plates, but not sufficiently to cause the lever arm 87 to move lever arm 86 to interrupt the lamp circuit. As soon as the drill has been placed in the designated compartment, he then presses the latch 74 free of the lever arm, and the parts are returned to starting position by the force of spring 50.

In the alternative or modified form of device which has been illustrated in Figs. 11 to 14 inclusive, the same principles and mode of use which apply to the device of Fig. 1 have been embodied. This modified device comprises a rigid base member that can be readily fixed to a support. It includes a horizontal guide rail 110 supported at its opposite ends by legs 111. A carriage 112 is mounted for easy reciprocal movement on the rail 110 and on it there is fixed a block 113 formed with a flat top surface that slopes in the direction of the reciprocal travel of the carriage.

At one end, the base member is formed with a standard 115 to which an arm 116 is rigidly fixed. This arm extends over and along the rail 110. It is formed with a flat under surface 116a that lies in a plane parallel to the plane of the sloping top surface or the block 113.

In the arrangement of parts as above described, measurement of a drill rod is effected in the same manner as explained in connection with the device of Fig. 1, that is, by placing the drill rod upon and transversely of the inclined surface of the block 113, then shifting the block along the guide rail 110 so as to engage the rod flatly against the inclined under surface of the arm 116. The diameter of the rod is indicated by the relationship of a pointer 118 that is fixed to the carriage 112 and which moves therewith along a graduated scale 119 formed on top of the arm 116 as shown in Fig. 13. For convenience, a second graduated scale 120, is also applied to the front face of the arm 116 and this can be viewed through an opening 121 in the pointer arm, which opening is equipped with magnifying lens 122 to provide easier reading. In order that any drill rods to be measured may be easily positioned and held properly on the inclined top surface of the block 113 for its measurement, the block is formed longitudinally on its top surface with a plurality of laterally spaced ribs 125. These ribs are recessed as at 126 to receive the rod and to seat it against the inclined surface of the block in position extending directly across the block. The undersurface of the arm 116 is channeled as at 127 in Fig. 12, to receive these ribs when the inclined surfaces of arm and block closely approach each other.

It is also shown in Fig. 11 that the block 113 is formed with a relatively deep transverse recess 130 in which rods of larger diameter may be placed for measurement. It is anticipated that the higher inclined surface of the block be used for the measurement of rods up to ½ inch in diameter, and that the lower inclined surface, which forms the base of the recess 130, be used when rods of more than ½" in diameter are to be measured. It is to be understood that the bottom surface of recess 130 is parallel to the slope of arm 116. The scales associated with the pointer would be graduated accordingly.

In order to indicate by electrical means, the diameter of a measured drill, the same arrangement of electric lights and circuit connections as disclosed in Fig. 10 can be used, except wherein Fig. 10 I show the circuit closing arm 86, which was previously disclosed as being actuated through the gear train in accordance with the travel of carriage 34, in the present instance the circuits for the various lights 82 are controlled by a contact element 150 which is in the form of a roller and which is mounted on the underside of the carriage 112 for rolling engagement with a succession of contacts 155 that are supported parallel with and below the rail 110.

The contacts 155 as herein shown were originally the individual convolutions of a coil of insulated wire mounted by a non-conductive rod 158 that is extended between the legs 111—111 of the base frame as in Fig. 11, but which, after the coil was mounted, were separated or disconnected by slotting the coil lengthwise, as shown at 160 in Fig. 12.

Individual taps lead off from the separated contact members 155 and these extend to the diameter indicating lamps 82 in the same manner and for the same purpose as do the wires 102 that lead from the contacts 90 to the lamps in the disclosure in Fig. 3. These taps are designated at 162 in Fig. 15.

It is to be understood that in this particular arrangement of contacts, one side of the supply circuit is connected to roller 150 by wire 101 and the other side of the circuit has leads 102 to one side of the individual lamps, 82, which have their sides connected to the separated parts 155 of the coil.

In the use of the device of Fig. 11, the carriage is moved to the left end of the bar 110, in reference to its showing in Fig. 11, the rod to be measured is placed on the block 113 and the block moved to the right until it is stopped. The roller 150 then closes the circuit to the lamp that designates the size of the rod.

It is also possible for the operator to get a direct visual reading by reference to the pointer and graduated scales along which it moves.

This latter device is exceedingly simple in its construction and mode of use, yet it embodies all the features of the device of Fig. 1.

What I claim as new is:

1. A drill measuring apparatus of the character described comprising a frame structure, a carriage mounted therein for reciprocal movement in a fixed plane, a flat plate fixed in said frame structure, spaced from the plane of travel of the carriage and sloped relative to said plane in the direction of carriage travel, another flat plate, fixed on the carriage in a plane parallel with the first mentioned plate and adapted to engage flatly therewith to definitely establish the limit of travel of the carriage in one direction, spring means for effecting movement of the carriage in one direction to provide open space between said plates for the disposition of an object to be measured between them, means for moving the carriage in the other direction to cause said object to be clamped between said plates, and a thickness indicating means mounted on said frame structure and movable in accordance with movements of the carriage and graduated to indicate by the distance of spacing of the plates, the thickness of an object as thus gripped between said plates.

2. A measuring apparatus according to claim 1 wherein the thickness indicating means comprises a rotatably mounted and calibrated dial equipped with a driving gear, and wherein a rack bar moves longitudinally in accordance with the carriage movement and gearing operatively connects the rack bar and dial driving gear to effect the rotative movements of the dial in opposite directions in accordance with travel of the carriage in opposite directions.

3. Drill measuring apparatus as recited in claim 1 wherein the carriage is reciprocally movable in opposite directions between definite stops, one of which stops comprises said first mentioned plate as fixed in the main frame and as engaged by said second plate when moved into flat engagement therewith; said second mentioned plate being mounted on the carriage for adjustment longitudinally relative thereto.

4. Drill measuring apparatus as recited in claim 2 wherein said gearing which provides the operative connection between the dial and rack bar includes a gear therein that is fixed on a shaft rotatably supported in said frame structure and extended therefrom, and equipped on its extended portion with means for effecting its manual rotation for shifting movement of the carriage.

5. Drill measuring apparatus according to claim 2 wherein spring means acts on the carriage moving means to urge the carriage in that direction which effects a separation of said plates to receive an object between them for measurement, and wherein the means for moving the carriage in the opposite direction is manually operable and includes a lever adapted to be moved from released position into holding position, a releasable latch for retaining the lever in holding position and a spring that is placed under tension by the moving of said lever to its latched position; said spring tension overcoming the first spring and yieldable to compensate for the measuring of objects of different thicknesses.

6. Measuring apparatus according to claim 2 wherein said dial is calibrated to indicate the sizes of measured objects and a second dial is mounted for operation through said dial driving gearing to indicate the extent of oversize or undersize of any measured object.

7. Drill measuring and sorting means comprising in combination, drill diameter measuring means including relative movable plates between which a drill may be disposed and clamped for diameter measurement, means for effecting the relative movement of said plates for the taking of a measurement, a storage cabinet equipped with compartments for drills of different diameters, an electric lamp associated with each compartment, a normally open circuit for each lamp, a contact for each circuit electrically connected with one side of the corresponding lamp, an arm movable in accordance with relative movement of said plates, an electrical contact on the arm connected with the other side of the lamp circuit and adapted, in movement of the arm to a drill measuring position, to engage with that one of the first mentioned contacts which will effect the closing of a circuit to the lamp which will designate the compartment designed to receive the drill being measured.

8. A combination as recited in claim 7 including also a chart on which the different drill sizes are noted, and an electric lamp associated with each notation of size on the chart; said lamps being in series circuit connection with the lamps as applied to the compartments of the cabinet which are to receive drills of like size.

9. The combination according to claim 7 wherein said arm is mounted for rotation about a stationary axis, and is actuated by means which rotates about the same axis and which has a lost motion connection with the first arm permitting limited relative movement of the first arm, and said second arm being movable by and in accordance with relative movement of the measuring plates and by reason of the lost motion connection with the first arm permits release of a drill from between the measuring plates without moving the first arm from its circuit closing position.

10. Drill measuring and sorting means comprising in combination, a frame structure, a carriage mounted therein for reciprocal movement in a fixed plane between established limits, a flat plate fixed in said frame structure spaced from the plane of travel of the carriage, and sloped relative to said plane in the direction of carriage travel, another flat plate fixed on the carriage in a plane parallel with the carriage in a plane parallel with the first plate to engage flatly thereagainst to limit the carriage travel in one direction, means for moving the carriage in the opposite direction to provide space between the plates for disposition of an article to be measured between them, and manual means for moving the carriage in the other direction to cause said object to be clamped between said plates, a cabinet equipped with separate compartments each for storage therein of drills of a specific size, an incandescent lamp associated with each compartment, a normally open circuit for each lamp and means movable by the carriage moving means for closing the circuit to the lamp representing the compartment designed to receive any measured drill.

11. A measuring device of the character described comprising a support, a carriage mounted thereon for reciprocal travel in a straight line, an arm rigidly fixed relative to said support and extending along and spaced from the same, a block fixed on the carriage and formed with a flat surface that slopes relative to and in the direction of travel of the carriage; said arm having a flat surface that faces directly toward and is parallel to the flat surface of said block; said carriage being movable along said support in one direction to cause said flat surfaces of the block and arm to be moved apart for reception of an object between them for measurement, and movable in the opposite direction to clamp said object between them, a series of electric contacts, mounted in fixed position along the path of travel of the carriage, in close predetermined spacing, a movable contact on the carriage for engaging said first mentioned contacts individually as the carriage is moved along its support, an electrically energized indicator corresponding to each of said contacts in said series and an electric circuit for each indicator; said circuit having connection at one side with each of said series of contacts and at its other side with the movable contact.

References Cited in the file of this patent
UNITED STATES PATENTS 1,715,405    Bull _____ June 4, 1929